US010508722B2

(12) United States Patent
Yamasaki et al.

(10) Patent No.: US 10,508,722 B2
(45) Date of Patent: Dec. 17, 2019

(54) ELECTRIC LINEAR MOTION ACTUATOR AND ELECTROMECHANICAL BRAKE SYSTEM

(71) Applicant: NTN CORPORATION, Osaka (JP)

(72) Inventors: Tatsuya Yamasaki, Shizuoka (JP); Masaaki Eguchi, Shizuoka (JP)

(73) Assignee: NTN CORPORATION, Osaka (JP)

( * ) Notice: Subject to any disclaimer, the term of this patent is extended or adjusted under 35 U.S.C. 154(b) by 230 days.

(21) Appl. No.: 15/527,928

(22) PCT Filed: Nov. 4, 2015

(86) PCT No.: PCT/JP2015/080996
§ 371 (c)(1),
(2) Date: May 18, 2017

(87) PCT Pub. No.: WO2016/080186
PCT Pub. Date: May 26, 2016

(65) Prior Publication Data
US 2018/0313438 A1 Nov. 1, 2018

(30) Foreign Application Priority Data

Nov. 19, 2014 (JP) .................................. 2014-234664
Dec. 22, 2014 (JP) .................................. 2014-258572

(51) Int. Cl.
*F16H 25/22* (2006.01)
*F16D 65/18* (2006.01)
(Continued)

(52) U.S. Cl.
CPC ........ *F16H 25/2252* (2013.01); *B60T 13/741* (2013.01); *F16D 55/226* (2013.01);
(Continued)

(58) Field of Classification Search
CPC .... F16H 25/2252; F16H 19/02; F16H 19/025; F16H 25/20; F16H 35/18; H02K 7/06;
(Continued)

(56) References Cited

U.S. PATENT DOCUMENTS

2010/0084230 A1 4/2010 Yamasaki et al.
2011/0247904 A1 10/2011 Yamasaki
(Continued)

FOREIGN PATENT DOCUMENTS

EP 1 837 555 9/2007
JP 2007-56952 3/2007
(Continued)

OTHER PUBLICATIONS

Extended European Search Report dated Nov. 22, 2017 in European Patent Application No. 15861411.5.
(Continued)

*Primary Examiner* — Melanie Torres Williams
(74) *Attorney, Agent, or Firm* — Wenderoth, Lind & Ponack, L.L.P.

(57) ABSTRACT

An electric linear motion actuator is provided which includes an outer ring member, a rotary shaft, planetary rollers, and a carrier including a disk, and in which the outer ring member is formed with a helical rib, each of the planetary rollers being formed with circumferential grooves in which the helical rib is engaged. When the rotary shaft rotates, the planetary rollers rotate about their axes while revolving around the rotary shaft so that the outer ring member axially linearly moves. The actuator includes thrust roller and retainer assemblies each mounted between one of the planetary roller and the disk of the carrier, and each guided by a raceway, i.e., an end surface of the corresponding planetary roller. The actuator includes a common raceway disk common to all of the thrust roller and retainer (Continued)

assemblies, and mounted between the thrust roller and retainer assemblies and the disk of the carrier.

20 Claims, 10 Drawing Sheets

(51) Int. Cl.
  *H02K 7/06* (2006.01)
  *B60T 13/74* (2006.01)
  *F16D 55/226* (2006.01)
  *F16H 19/02* (2006.01)
  *F16D 121/24* (2012.01)
  *F16D 125/40* (2012.01)
  *F16D 125/48* (2012.01)
  *F16D 125/50* (2012.01)
  *F16H 25/20* (2006.01)

(52) U.S. Cl.
  CPC ........... *F16D 65/18* (2013.01); *F16D 65/183* (2013.01); *F16H 19/025* (2013.01); *H02K 7/06* (2013.01); *F16D 2121/24* (2013.01); *F16D 2125/40* (2013.01); *F16D 2125/48* (2013.01); *F16D 2125/50* (2013.01); *F16D 2250/0023* (2013.01); *F16D 2250/0038* (2013.01); *F16H 2025/2081* (2013.01)

(58) Field of Classification Search
  CPC ...... B60T 13/741; F16D 55/226; F16D 65/18; F16D 65/183
  See application file for complete search history.

(56) References Cited

U.S. PATENT DOCUMENTS

| | | |
|---|---|---|
| 2013/0186717 A1 | 7/2013 | Muramatsu et al. |
| 2013/0292215 A1 | 11/2013 | Eguchi et al. |
| 2014/0262634 A1 * | 9/2014 | Yamasaki ............... F16D 55/00 188/72.1 |

FOREIGN PATENT DOCUMENTS

| | | | |
|---|---|---|---|
| JP | 2010-90959 | 4/2010 | |
| JP | 2011-179542 | 9/2011 | |
| JP | 2012-57681 | 3/2012 | |
| JP | 2012-149747 | 8/2012 | |
| WO | 2008/140097 | 11/2008 | |
| WO | 2012/053469 | 4/2012 | |
| WO | WO-2012098977 A1 * | 7/2012 | .......... F16H 25/2266 |
| WO | WO-2013065724 A1 * | 5/2013 | ............. H02K 29/06 |

OTHER PUBLICATIONS

International Search Report dated Jan. 26, 2016 in corresponding International (PCT) Application No. PCT/JP2015/080996.
International Preliminary Report on Patentability dated May 23, 2017 in corresponding International (PCT) Application No. PCT/JP2015/080996.

* cited by examiner

ELECTRIC LINEAR MOTION ACTUATOR AND ELECTROMECHANICAL BRAKE SYSTEM

TECHNICAL FIELD

The present invention relates to an electric linear motion actuator for linearly driving a driven member such as a brake pad, and to an electromechanical brake system in which the electric linear motion actuator is used.

BACKGROUND ART

The below-identified Patent document 1 discloses an electric linear motion actuator configured to convert the rotation of a rotor shaft of an electric motor into the linear motion of a driven member supported by a motion converting mechanism to be movable in the axial direction.

The electric linear motion actuator of Patent document 1 includes a rotary shaft configured to be rotated by an electric motor, an outer ring member formed on its inner diameter surface with a helical rib, a plurality of planetary rollers provided between the rotary shaft and the outer ring member, and each formed in the outer diameter surface thereof with a helical groove or circumferential grooves, and a carrier supported to be rotatable about the rotary shaft, and rotatably supporting the planetary rollers, the electric linear motion actuator being configured such that when the rotary shaft rotates, due to the frictional contact of the planetary rollers with the rotary shaft, the planetary rollers rotate about their axes while revolving around the rotary shaft so that the outer ring member and the carrier axially linearly move relative to each other due to the engagement of the helical rib of the outer ring member in the helical grooves or circumferential grooves of the planetary rollers.

The electric linear motion actuator of Japanese Unexamined Patent Application Publication No. 2010-90959 further includes a pair of disks constituting the carrier, and thrust roller bearings each mounted between one of the planetary rollers and the surface of one of the disks that is opposed to the one of the planetary rollers such that the thrust loads applied to the planetary rollers are supported by the respective thrust roller bearings, thereby reducing the rotational resistance of the planetary rollers while rotating about their axes.

Since the electric linear motion actuator of Japanese Unexamined Patent Application Publication No. 2010-90959 is configured to axially linearly move the outer ring member and the carrier relative to each other due to the engagement of the helical rib of the outer ring member in the helical grooves or circumferential grooves of the planetary rollers, a force increasing function can be obtained without separately providing a reduction mechanism such as planetary gears, and thus this actuator is suitable for an electromechanical brake system in which a linear motion stroke is relatively small.

The electric linear motion actuator of Japanese Unexamined Patent Application Publication No. 2010-90959 includes thrust roller bearings rotatably supporting the respective planetary rollers, and each comprising a single raceway disk and a thrust roller and retainer assembly which is the combination of a plurality of roller elements and a retainer radially retaining the roller elements. Since it is necessary to separately mount the thrust roller and retainer assembly and the single raceway disk to each roller shaft rotatably supporting the corresponding planetary roller, it takes time to assemble the carrier. Also, misplacements and/or inadvertent omissions of components of such thrust roller bearings tend to occur.

The above electric linear motion actuator further includes a plurality of pillar members retaining the pair of disks at a predetermined distance from each other, and each formed in the end surfaces thereof with threaded holes. The carrier is assembled by threadedly engaging bolts in the threaded holes of the disks through bolt insertion holes of the disks, and fastening the bolts. As a result thereof, it takes a lot of time to assemble the carrier. Therefore, a measure needs to be taken to easily assemble the carrier.

Also, since it is necessary to form bolt insertion holes and threaded holes by machining, costs are high. Therefore, a measure needs to be taken to reduce costs.

It is an object of the present invention to easily assemble a carrier supporting planetary rollers.

SUMMARY OF THE INVENTION

In order to achieve the above object, the present invention provides, as a first embodiment, an electric linear motion actuator comprising: a housing; a cylindrical outer ring member having a center axis, and mounted in the housing; a rotary shaft arranged on the center axis of the outer ring member, and configured to be rotated by an electric motor; a carrier including opposed first and second disks configured to be rotatable about the rotary shaft, and a plurality of pillar members retaining the first and second disks at a predetermined distance from each other; a plurality of planetary rollers mounted between an outer diameter surface of the rotary shaft and an inner diameter surface of the outer ring member, and rotatably supported by the carrier. The outer ring member is formed, on the inner diameter surface of the outer ring member, with a helical rib, and each of the planetary rollers is formed, in an outer diameter surface of the planetary roller, with either circumferential grooves or a helical groove in which the helical rib is engaged; and a plurality of thrust roller and retainer assemblies each mounted between one of the planetary rollers and a surface of the first disk of the carrier that is opposed to the one of the planetary rollers such that thrust loads applied to the planetary rollers are supported by the respective thrust roller and retainer assemblies. The electric linear motion actuator is configured such that when the rotary shaft rotates, due to frictional contact of the planetary rollers with the rotary shaft, the planetary rollers rotate about axes of the respective planetary rollers while revolving around the rotary shaft so that the outer ring member and the carrier axially linearly move relative to each other. The electric linear motion actuator further comprises a common annular raceway disk common to all of the thrust roller and retainer assemblies, the common annular raceway disk being mounted between the thrust roller and retainer assemblies and a surface of the first disk that is opposed to the thrust roller and retainer assemblies.

Preferably, the above electric linear motion actuator is configured such that the raceway disk is formed by plastic working of a metal member so as to reduce costs, and the raceway disk includes a raceway opposed to the thrust roller and retainer assemblies and heat-treated so as to increase the hardness of the raceway for high durability.

In order to achieve the above object, the present invention further provides, as a second embodiment, an electric linear motion actuator omitting the common annular raceway disk of the electric linear motion actuator according to the first embodiment, and the first disk includes an inner surface opposed to the thrust roller and retainer assemblies, and configured to serve as a common raceway that is common to all of the thrust roller and retainer assemblies.

Preferably, the electric linear motion actuator according to the second embodiment is configured such that the first disk is formed by plastic working of a metal member, and the common raceway, by which the roller elements of the respective thrust roller and retainer assemblies are guided while rolling, is a surface heat-treated so as to increase the hardness of the raceway for high durability.

Preferably, the electric linear motion actuators according to the first and second embodiments are configured such that each of the first and second disks is formed with connection holes, and each of the pillar members includes two ends press-fitted, respectively, in one of the connection holes of the first disk and in a corresponding one of the connection holes of the second disk so that the carrier is assembled. Since the carrier is assembled by press-fitting the two ends of each of the pillar members into one of the connection holes of the first disk and the corresponding connection hole of the second disk, it is possible to very easily assemble the carrier, compared to assembling the carrier by fastening the first and second disks and the pillar members by bolts.

The connection holes of the first and second disks may be formed at the same time as the first and second disks are formed either by plastic working, i.e., by pressing or forging, or by sintering metal powder. Therefore, by forming the first and second disks in this way, it is possible to dispense with machining, and thus to reduce costs.

The connection holes of the first and second disks may comprise through holes each extending through the corresponding first/second disk, blind holes each having a closed end wall, or stepped through holes each having a large diameter hole portion and a step which constitutes a bottom of the large diameter hole portion. If the connection holes of the first and second disks comprise such blind holes or stepped through holes, due to the closed end wall of each blind hole of the first disk and the closed end wall of the corresponding blind hole of the second disk, or due to the step of each stepped through hole of the first disk and the step of the corresponding stepped through hole of the second disk, it is possible to restrict the amount by which the corresponding pillar member is press-fitted therein. As a result thereof, the opposed first and second disks can be accurately positioned at a predetermined distance from each other, and thus the dimensional accuracy of the carrier is high.

The two ends of each of the pillar members may be each formed with a stepped portion having an outer diameter smaller than an outer diameter of a middle portion of the pillar member, and the stepped portions at the two ends of each of the pillar members may be press-fitted, respectively, in one of the connection holes of the first disk and in a corresponding one of the connection holes of the second disk.

By press-fitting the stepped portions of each pillar member therein as described above such that axial end surfaces formed at the roots of the respective stepped portions are brought into abutment with the opposed inner surfaces of the first and second disks, it is possible to restrict the amount by which the pillar members are press-fitted therein. As a result thereof, as in the connection holes comprising blind holes, the opposed first and disk disks can be accurately positioned at a predetermined distance from each other, and thus the dimensional accuracy of the carrier is high.

If the pillar members consist of three or more pillar members, it is possible to increase the strength of the carrier for high durability.

The present invention further provides, as a third embodiment, an electromechanical brake system comprising: a brake pad; a disk rotor; and an electric linear motion actuator configured to linearly drive the brake pad such that the brake pad is pressed against the disk rotor, thereby applying a braking force to the disk rotor. The electric linear motion actuator comprises the electric linear motion actuator according to the first or second embodiment.

The above electric linear motion actuators are configured such that when the rotary shaft rotates by driving the electric motor, due to the frictional contact of the planetary rollers with the rotary shaft, the planetary rollers rotate about their axes while revolving around the rotary shaft so that the outer ring member and the carrier axially linearly move relative to each other due to the engagement of the helical rib of the outer ring member in the helical grooves or circumferential grooves of the planetary rollers.

Therefore, by connecting the brake pad of the electromechanical brake system to the outer ring member or the carrier, the brake pad can be linearly driven to be pressed against the disk rotor, thereby applying a braking force to the disk rotor.

Effects of the Invention

By providing a common annular raceway disk common to all of the thrust roller and retainer assemblies as in the first embodiment, or by, as in the second embodiment, using the inner surface of the first disk opposed to the thrust roller and retainer assemblies as a common raceway common to all of the thrust roller and retainer assemblies, it is possible to reduce the number of components of such a thrust roller bearing, to easily assembly the carrier, and to prevent misplacements and/or inadvertent omissions of components of such a thrust roller bearing.

DETAILED DESCRIPTION OF THE INVENTION

The embodiments of the present invention are now described with reference to the drawings. FIGS. 1 to 6 illustrate an electric linear motion actuator A embodying the present invention, and used in the electromechanical brake system shown in FIGS. 13 and 14.

Figure 13:
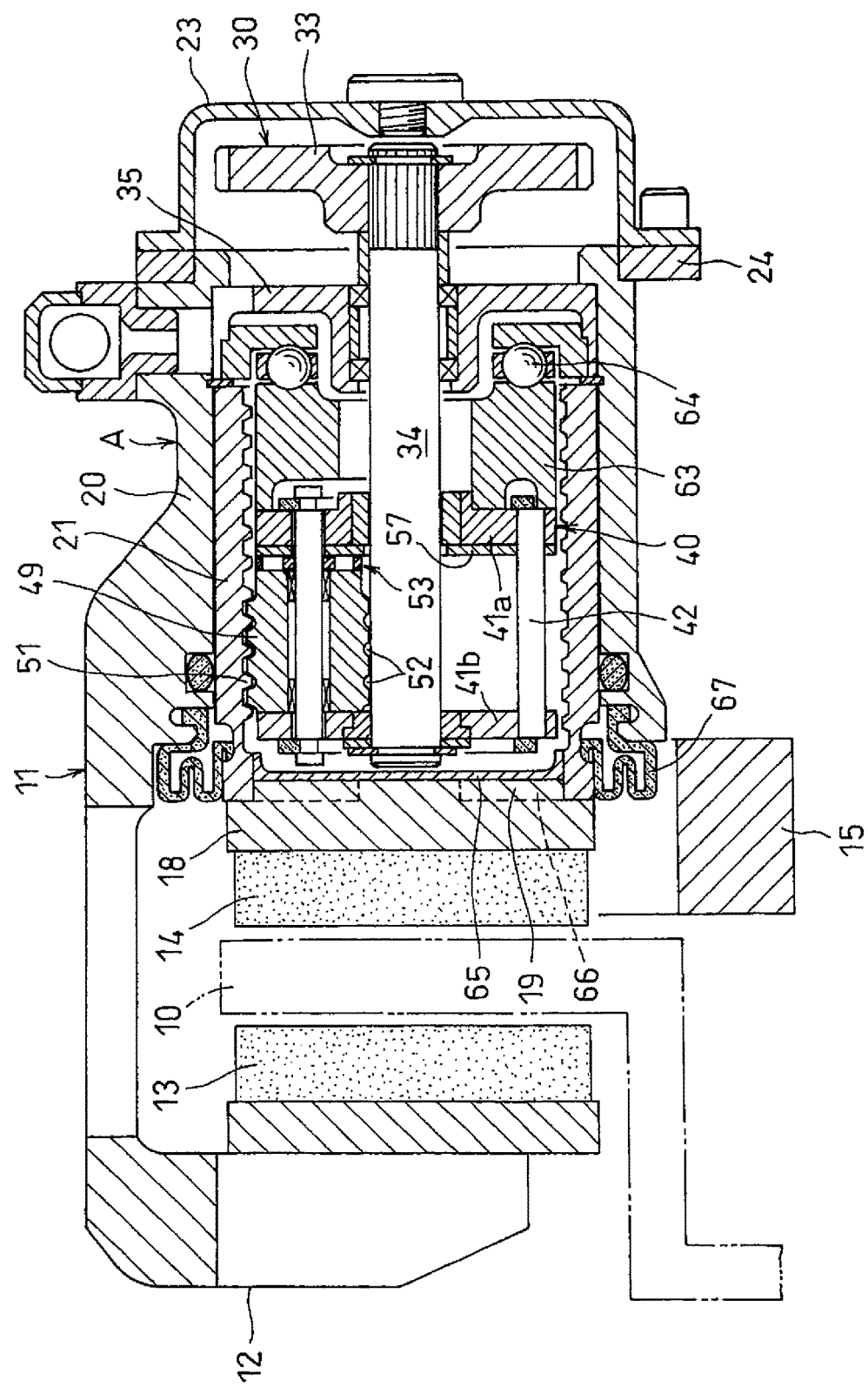
FIG. 13 is a longitudinal sectional view of an electromechanical brake system embodying the present invention.
Figure 14:
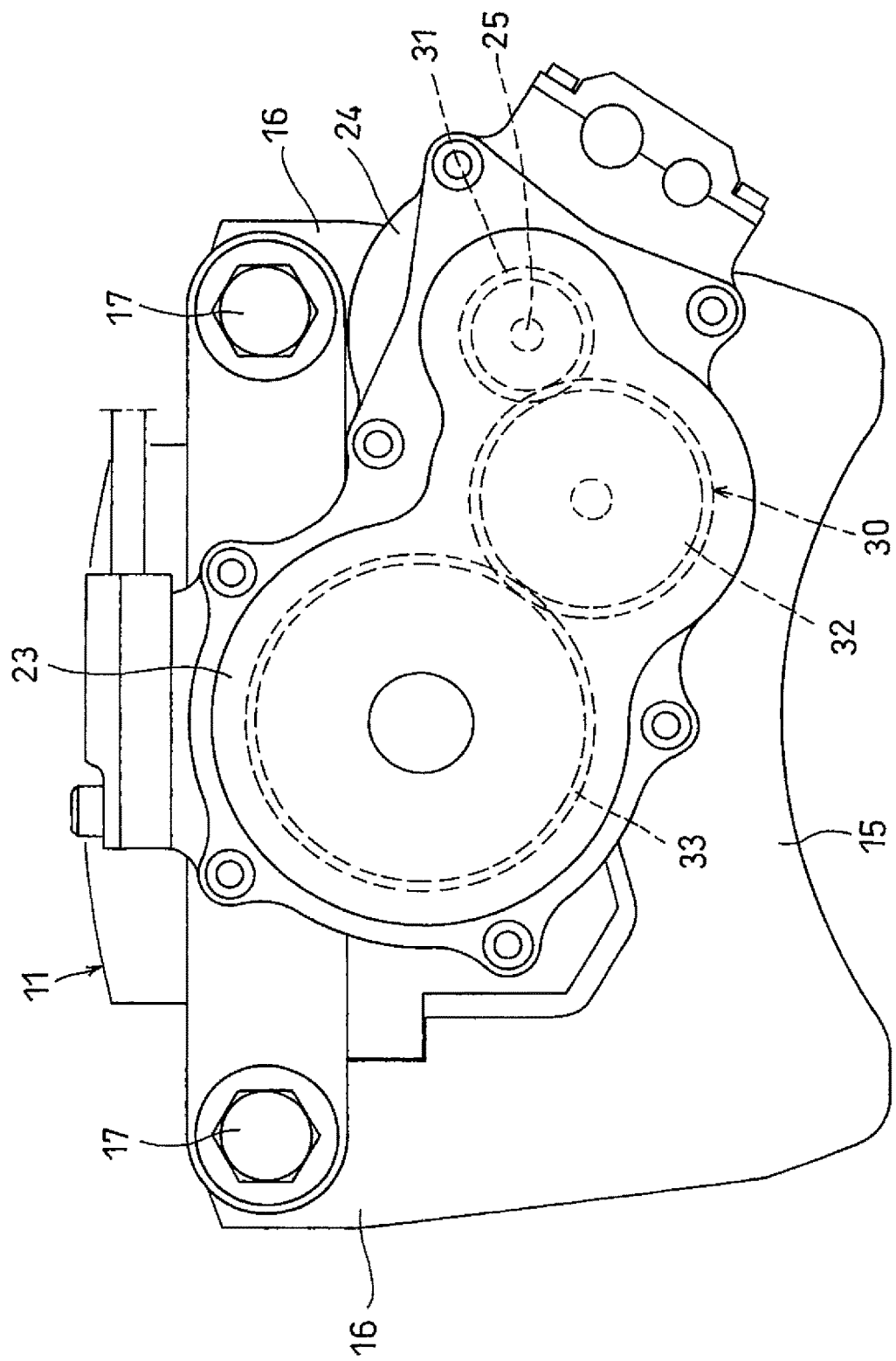
FIG. 14 is a view illustrating the right side of the electromechanical brake system illustrated in FIG. 13.

The electromechanical brake system of FIGS. 13 and 14 includes a disk rotor 10 configured to rotate together with a wheel (not shown), a caliper 11 provided adjacent to the outer peripheral portion of the disk rotor 10, and having a claw portion 12 provided at one end portion of the caliper 11 and axially opposed to the outer peripheral portion of the outboard surface of the disk rotor 10, and an outboard brake pad 13 supported by the claw portion 12.

The electromechanical brake system further includes an inboard brake pad 14 opposed to the outer peripheral portion of the inboard surface of the disk rotor 10, and an electric linear motion actuator A provided at the other end portion of the caliper 11, and configured to move the inboard brake pad 14 toward the disk rotor 10.

A mount 15 is provided near the outer peripheral portion of the inboard surface of the disk rotor 10. The mount 15 is fixed in position by being supported by a knuckle (not shown), and is provided, on both side portions of the mount 15, with a pair of pin supporting pieces 16 opposed to each other. The pin supporting pieces 16 are each provided, at one end thereof, with a slide pin 17 extending in the direction orthogonal to the disk rotor 10. The caliper 11 is slidably supported by the slide pins 17.

Though not illustrated in detail in the drawings, the mount 15 supports the outboard and inboard brake pads 13 and 14 such that the brake pads 13 and 14 are movable toward the disk rotor 10, but are non-rotatable (rotationally fixed).

Figure 1:
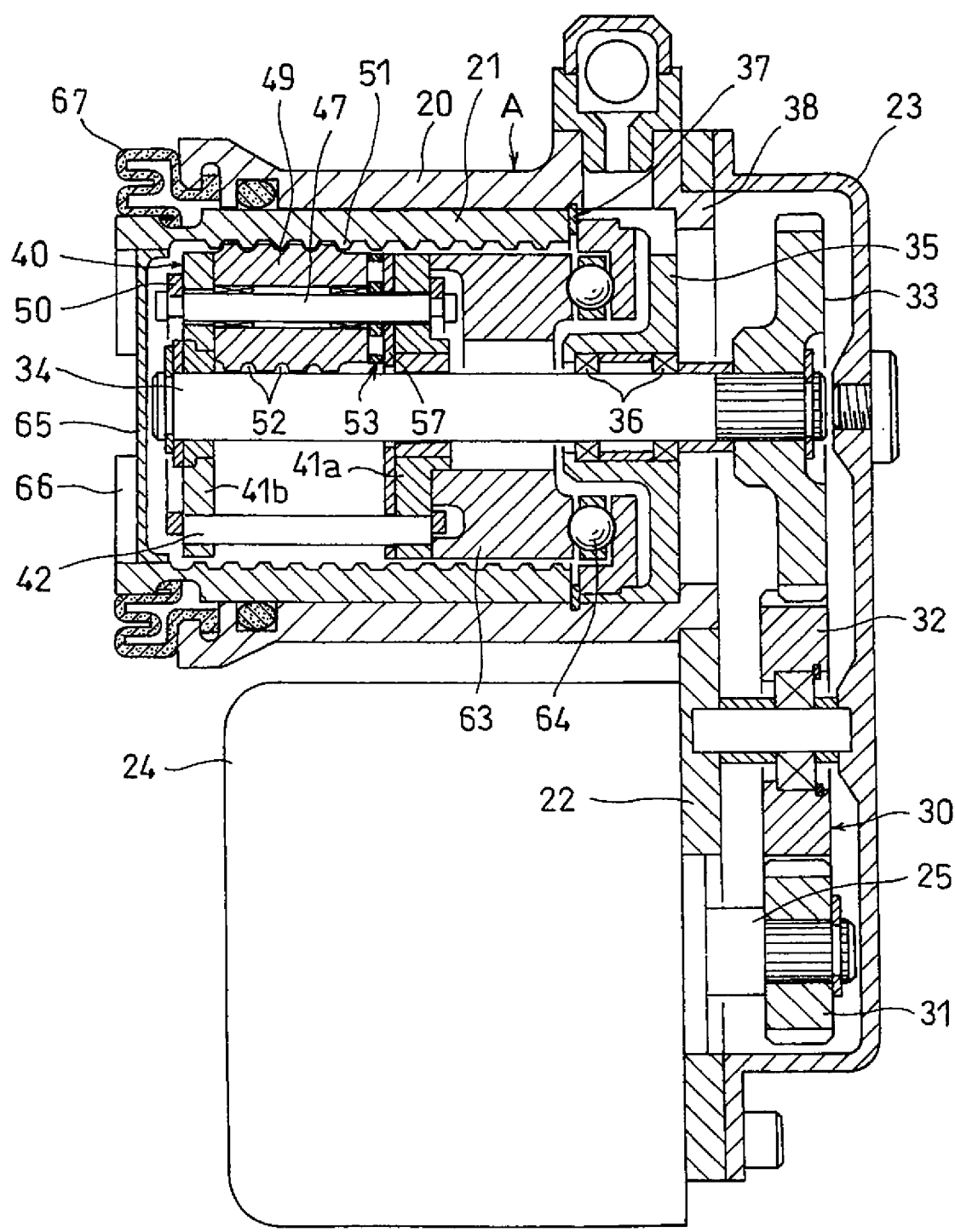
FIG. 1 is a longitudinal sectional view of an electric linear motion actuator embodying the present invention.

As illustrated in FIG. 1, the electric linear motion actuator A includes a tubular housing 20 integral with the caliper 11 (illustrated in FIG. 13), and a tubular outer ring member 21 slidably mounted in the housing 20.

The electric linear motion actuator A further includes a radially outwardly extending base plate 22 at one end of the housing 20, and a cover 23 covering the outer side surface of the base plate 22 and an opening of the housing 20 at the one end of the housing 20 such that the base plate 22 and the cover 23 constitute a gear case.

An electric motor 24 is supported by the base plate 22. The electric motor 24 includes a rotor shaft 25, and the rotation of the rotor shaft 25 is reduced in speed by a reduction gear mechanism 30 provided in the gear case constituted by the base plate 22 and the cover 23, and is output to the below-described rotary shaft 34.

As illustrated in FIGS. 1 and 14, the reduction gear mechanism 30 includes an input gear 31 attached to the rotor shat 25 of the electric motor 24, an intermediate gear 32 meshing with the input gear 31, and an output gear 33 meshing with the intermediate gear 32, and having an outer diameter larger than that of the input gear 31.

As illustrated in FIG. 1, the output gear 33 is supported by the rotary shaft 34 of the electric linear motion actuator A at one end of the rotary shaft 34. The rotary shaft 34 extends through a shaft supporting member 35 provided inside of the one end portion of the housing 20, while being rotatably supported by a plurality of bearings 36 mounted between the shaft supporting member 35 and the rotary shaft 34, such that the rotary shaft 34 is coaxial with the outer ring member 21.

The shaft supporting member 35 is axially positioned by a snap ring 37 attached to the inner diameter surface of the housing 20, and an inwardly extending flange 38 at the one end of the housing 20.

Figure 2:
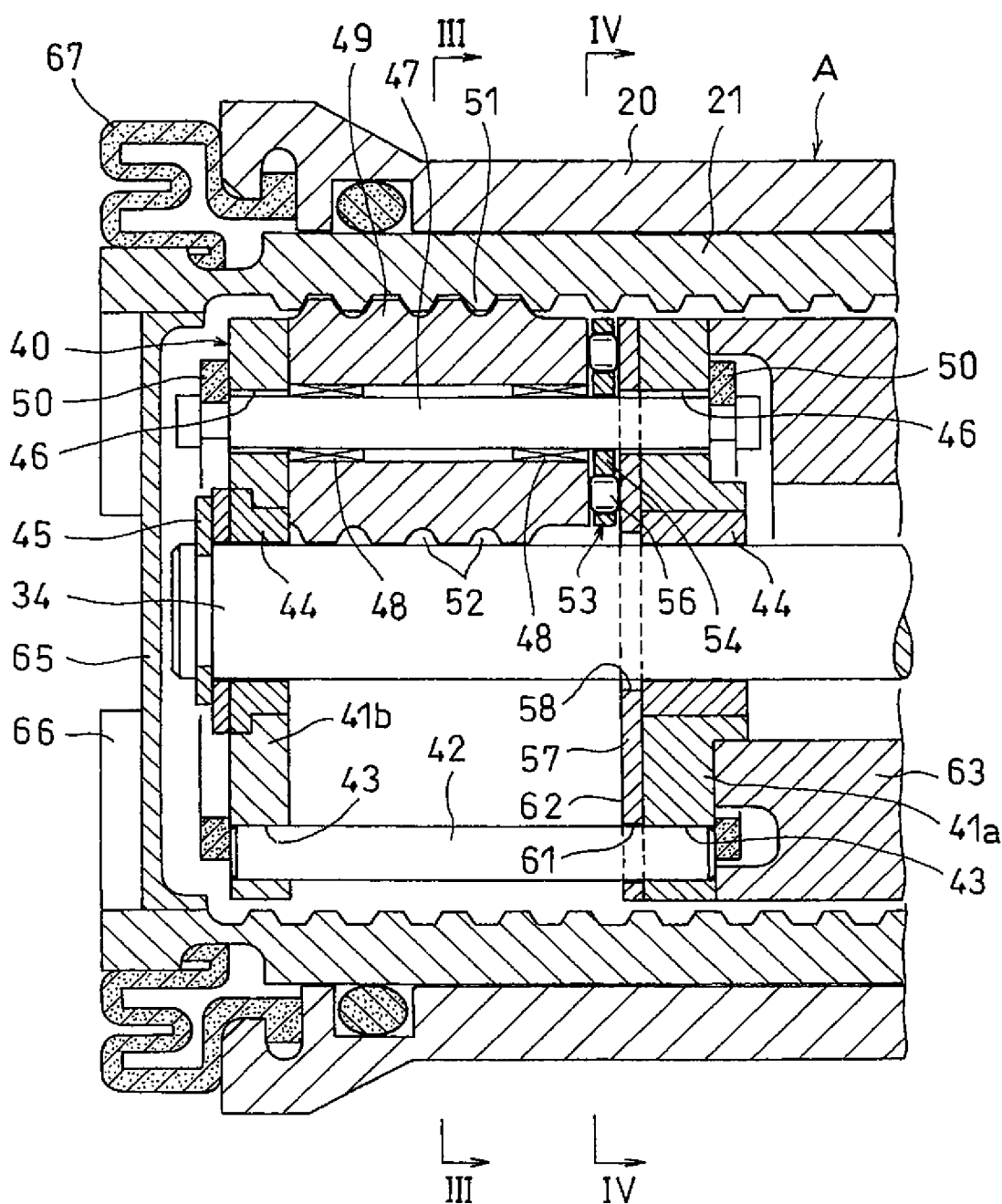
FIG. 2 is an enlarged sectional view of a portion of the electric linear motion actuator illustrated in FIG. 1.
Figure 3:
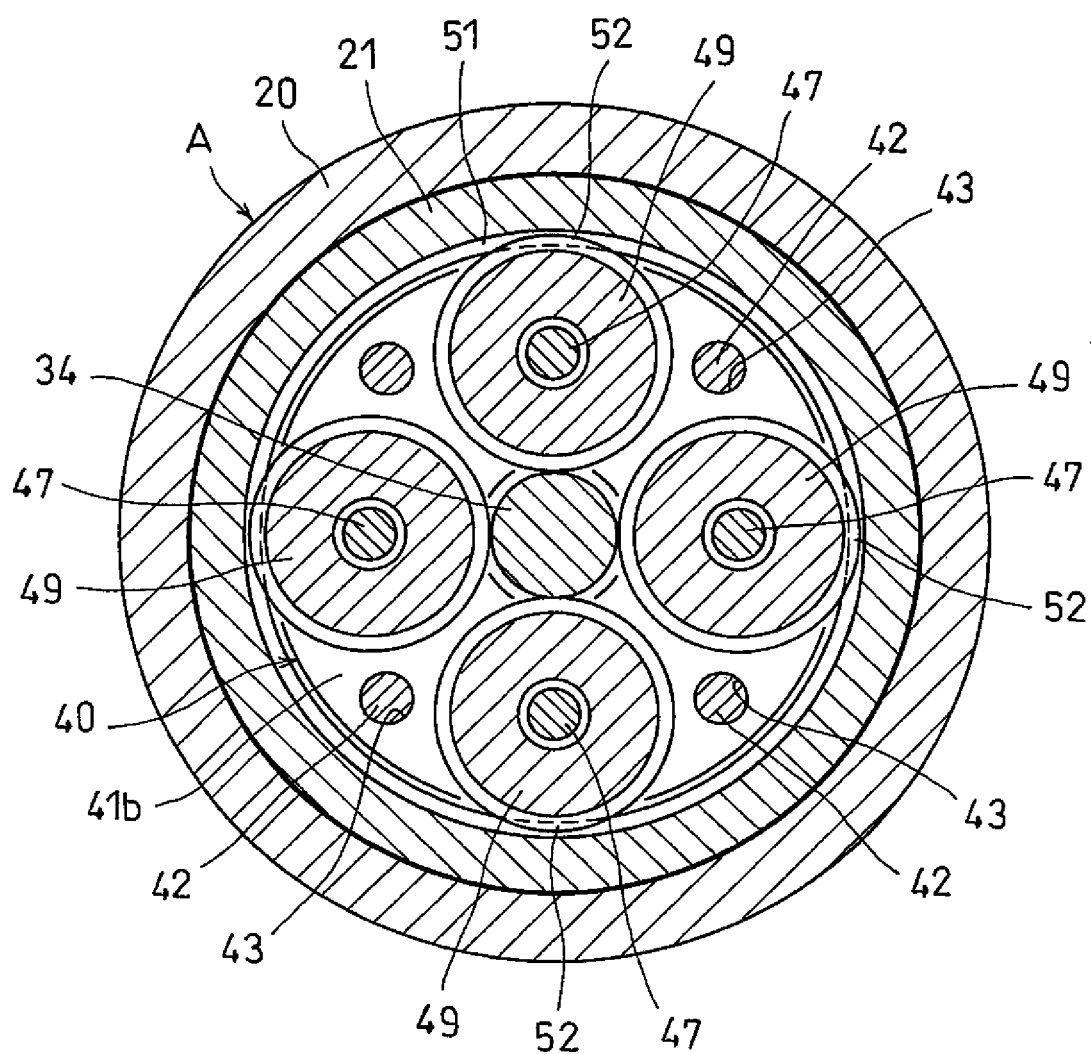
FIG. 3 is a sectional view taken along line III-III of FIG. 2.

As illustrated in FIGS. 1 and 2, the electric linear motion actuator A further includes a carrier 40 mounted on the rotary shaft 34 and inside of the outer ring member 21, and rotatable about the rotary shaft 34. As illustrated in FIGS. 2 and 3, the carrier 40 is constituted by a pair of disks 41a and 41b axially opposed to each other, and a plurality of pillar members 42 retaining the disks 41a and 41b at a predetermined distance from each other.

Each of the disks 41a and 41b is formed with a plurality of connection holes 43 circumferentially equidistantly spaced apart from each other, and each axially opposed to the corresponding connection hole 43 of the other disk. Both ends of each pillar member 42 are fitted, with interference, i.e., press-fitted, in the corresponding axially opposed connection holes 43 of the disks 41a and 41b, respectively. Due to this press-fitting, the pillar members 42 are coupled to the disks 41a and 41b, so that the carrier 40 is assembled.

In FIG. 3, the pillar members 42 consist of four pillar members circumferentially spaced apart from each other at 90 degree intervals. However, the number of the pillar members 42 is not limited to four, though the number needs to be three or more.

As illustrated in FIG. 2, the carrier 40 is supported by sliding bearings 44 mounted between the rotary shaft 34 and the respective inner diameter surfaces of the disks 41a and 41b so as to be rotatable about the rotary shaft 34. As shown in FIG. 2, the carrier 40 is prevented from separating from the other end of the rotary shaft 34 by a snap ring 45 attached to the other end of the rotary shaft 34.

The disks 41a and 41b of the carrier 40 are each formed with shaft inserting holes 46 circumferentially spaced apart from each other, and each axially opposed to the corresponding shaft inserting hole 46 of the other disk. The electric linear motion actuator A further includes roller shafts 47 each having both ends thereof inserted in the corresponding axially opposed shaft inserting holes 46 of the disks 41a and 41b, respectively; and planetary rollers 49 each rotatably supported by the corresponding roller shaft 47 through a pair of opposed bearings 48 fitted on the roller shaft 47.

The shaft inserting holes 46 of the disks 41a and 41b are radially elongated holes so that the roller shafts 47 are radially movable until the roller shafts 47 each abuts against the walls of the corresponding axially opposed elongated holes. The roller shafts 47 are inwardly biased by radially deformable elastic rings 50 each wrapped around the respective ends of the roller shafts 47 so that the planetary rollers 49 are pressed against the outer diameter surface of the rotary shaft 34. Therefore, when the rotary shaft 34 rotates, the planetary shafts 49 rotate due to the frictional contact of the planetary rollers 49 with the outer diameter surface of the rotary shaft 34.

As illustrated in FIGS. 2 and 3, the outer ring member 21 is formed with a helical rib 51 having a V-shaped cross section, and each planetary roller 49 is formed, in its outer diameter surface, with a plurality of circumferential grooves 52 which have the same pitch as that of the helical rib 51, and in which the helical rib 51 is engaged. The circumferential grooves 52 of each planetary roller 49 may be replaced by a helical groove having the same pitch as that of the helical rib 51 and a lead angle different from that of the helical rib 51.

Of the disks 41a and 41b of the carrier 40, the disk 41a is located on the side of the shaft supporting member 35, that is, located closer to the shaft supporting member 35 than is the disk 41b. A thrust roller and retainer assembly 53 is mounted between each planetary roller 49 and the portion of the inboard disk 41a of the carrier 40 that is opposed to the planetary roller 49.

Figure 4:
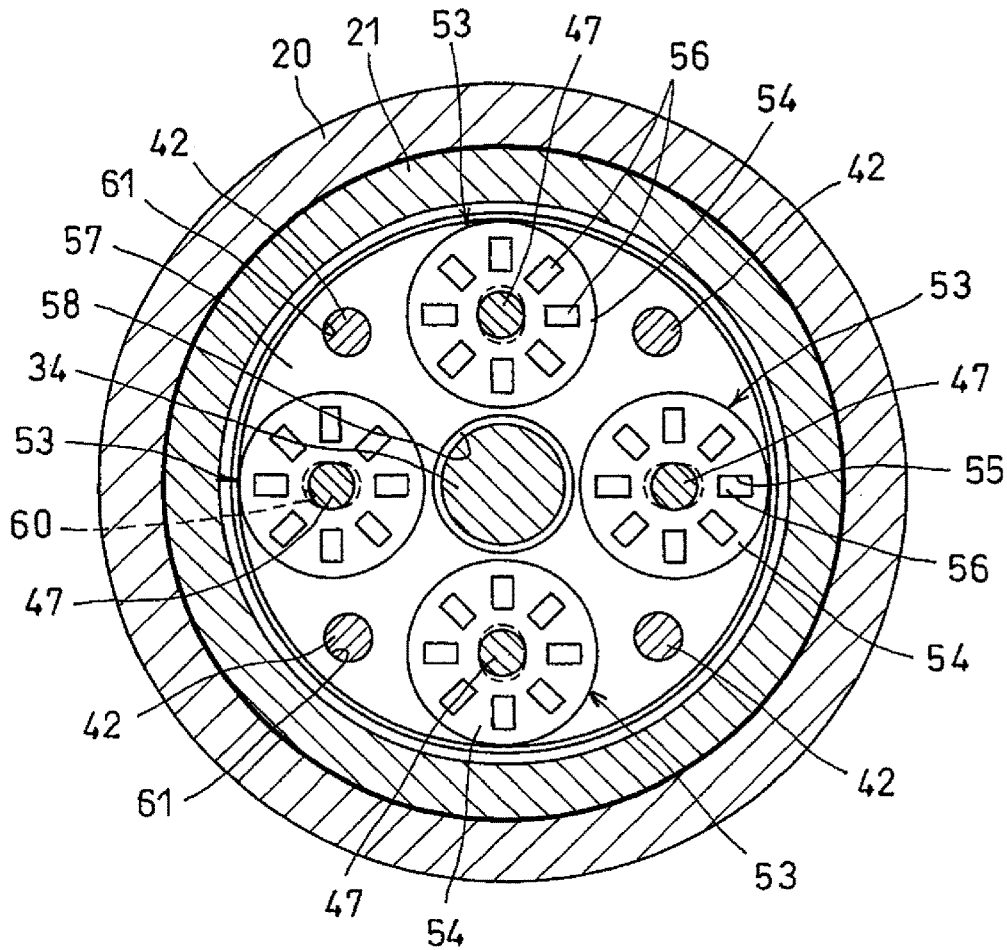
FIG. 4 is a sectional view taken along line IV-IV of FIG. 2.
Figure 5:
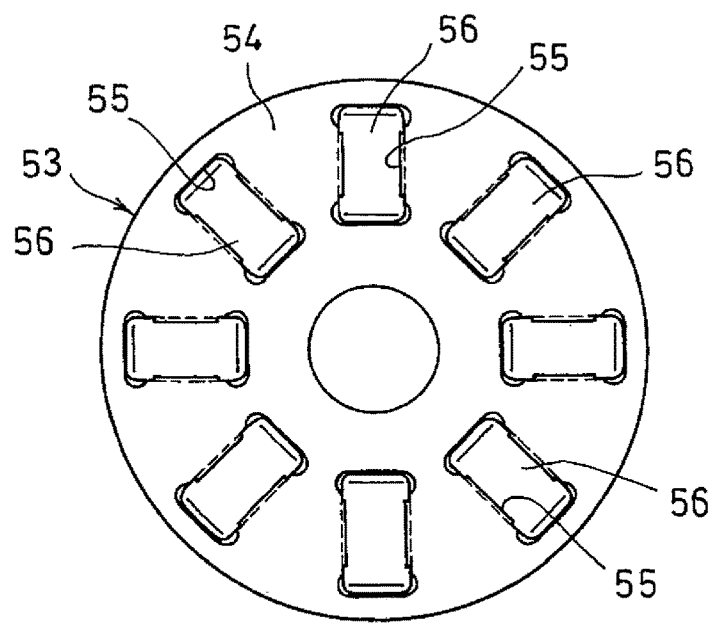
FIG. 5 is a front view of each thrust roller and retainer assembly.
Figure 6:
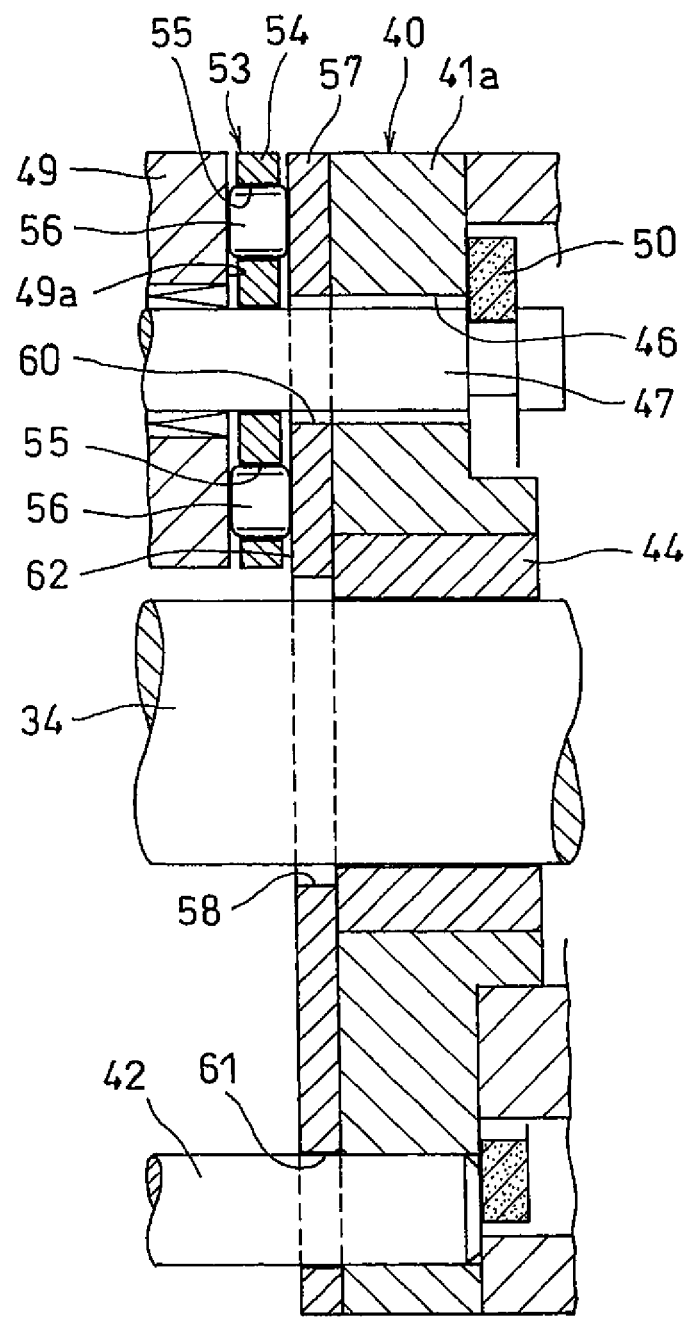
FIG. 6 is an enlarged sectional view of the portion of the electric linear motion actuator in which the common raceway disk of FIG. 1 is mounted.

As illustrated in FIGS. 4 to 6, each thrust roller and retainer assembly 53 is constituted by a retainer 54 in the form of an annular plate formed with a plurality of radially extending pockets 55, and roller elements 56 mounted in the respective pockets 55. The widths of the openings of the pockets 55 are smaller than the outer diameters of the respective roller elements 56, so that the roller elements 56 are prevented from moving out of the pockets 55.

Each planetary roller 49 includes an end surface 49a as a raceway 49a by which the roller elements 56 of the corresponding thrust roller and retainer assembly 53 are guided while rolling. The raceways 49a are subjected to heat treatment to increase their hardness. Also, the raceways 49a are ground to a surface roughness Ra of 0.2 or less.

A common raceway disk 57 that is common to all of the thrust roller and retainer assemblies 53 is mounted between the thrust roller and retainer assemblies 53 and the surface of the inboard disk 41a of the carrier 40 that is opposed to the thrust roller and retainer assemblies 53.

The raceway disk 57 is an annular member formed with a central hole 58 through which the rotary shaft 34 is inserted. Around the central hole 58, the raceway disk 57 has shaft inserting holes 60 through which the respective roller shafts 47 are inserted, and shaft inserting holes 61 through which the respective pillar members 42 of the carrier 40 are inserted.

The raceway disk 57 is formed by plastic working of, i.e., by pressing, a metal member. The raceway 62 of the raceway disk 57, by which the roller elements 56 of the respective thrust roller and retainer assemblies 53 are guided while rolling, is subjected to heat treatment, and has a surface roughness Ra of 0.2 or less.

As illustrated in FIG. 1, a backup plate 63 and a thrust bearing 64 are mounted between the inboard disk 41a of the carrier 40 and the shaft supporting member 35, which rotatably supports the rotary shaft 34, so that the thrust bearing 64 supports the axial reaction force applied to the carrier 40 from the outer ring member 21 through the planetary rollers 49.

A cover 65 is fitted in the outer ring member 21 at its outboard end. Anti-rotation grooves 66 are formed in the distal end surface of the outer ring member 21. Anti-rotation protrusions 19 are formed on a back plate 18 of the inboard brake pad 14 (see FIG. 13), and engaged in the respective anti-rotation grooves 66 so that the outer ring member 21 is rotationally fixed to the inboard brake pad 14.

A boot 67 is attached to the outboard ends of the housing 20 and the outer ring member 21 to seal the space between the outboard open end of the housing 20 and the distal end of the outer ring member 21.

The electromechanical brake system embodying the present invention is configured as described above. FIG. 13 illustrates the state in which a braking force is not applied to the disk rotor 10, namely, the brake pads 13 and 14 are separated from the disk rotor 10.

In this state, i.e., while no braking force is being applied to the disk rotor, when the electric motor 24 (see FIG. 1) is activated, the rotation of the rotor shaft 25 of the electric motor 24 is transmitted to the rotary shaft 34 after being reduced in speed in the reduction gear mechanism 30, so that the rotary shaft 34 rotates in the direction in which a braking force is applied to the disk rotor 10.

Since the outer diameter surfaces of the planetary rollers 49 are in elastic contact with the outer diameter surface of the rotary shaft 34, when the rotary shaft 34 rotates, due to the frictional contact of the planetary rollers 49 with the rotary shaft 34, the planetary rollers 49 rotate about their axes while revolving around the rotary shaft 34.

At this time, since the helical rib 51 formed on the inner diameter surface of the outer ring member 21 is engaged in the circumferential grooves 52 formed in the outer diameter surfaces of the respective planetary rollers 49, the outer ring member 21 axially moves, so that the inboard brake pad 14, which is kept in abutment with the outer ring member 21, abuts against the disk rotor 10 and begins to axially press the disk rotor 10. The reaction force to this pressing force moves the caliper 11 in the direction in which the outboard brake pad 13, supported by the claw portion 12, approaches the disk rotor 10, so that the outboard brake pad 13 abuts against the disk rotor 10. As a result thereof, the outboard brake pad 13 and the inboard brake pad 14 axially strongly sandwich the outer peripheral portion of the disk rotor 10, thereby applying a braking force to the disk rotor 10.

When a braking force is applied to the disk rotor 10 as described above, an axial load is applied to the planetary rollers 49 from the outer ring member 21, and this axial load is supported by the portions of the common raceway disk 57 and the portions of the thrust roller and retainer assemblies 53 that are in contact with each other. Since the roller elements 56 of the respective thrust roller and retainer assemblies 53 are guided, while rolling, by the raceway 62 of the common raceway disk 57, the planetary rollers 49 always rotate in a smooth manner.

After a braking force is applied to the disk rotor 10, when the rotor shaft 25 of the electric motor 24 is rotated in the reverse direction, the rotary shaft 34 (see FIG. 1) is rotated, while reduced in rotation speed, in the reverse direction to the direction in which a braking force is applied to the disk rotor 10, so that the respective planetary rollers 49 rotate about their axes in the reverse direction while revolving around the rotary shaft 34 in the reverse direction. Thus, due to the engagement of the helical rib 51 of the outer ring member 21 in the circumferential grooves 52 of the respective planetary rollers 49, the outer ring member 21 moves backward until the outer ring member 21 reaches the position illustrated in FIG. 13. This backward movement separates the outboard and inboard brake pads 13 and 14 from the disk rotor 10, thus releasing the brake.

As described above, and as illustrated in FIG. 6, in order to rotatably support the planetary rollers 49, the electric linear motion actuator A of the embodiment uses a thrust roller bearing comprising thrust roller and retainer assemblies 53 mounted between the respective planetary rollers 49 and the portions of the inboard disk 41a of the carrier 40 that are opposed to the planetary rollers 49; and a common raceway disk 57 which is common to all of the thrust roller and retainer assemblies 53, and is mounted between the thrust roller and retainer assemblies 53 and the surface of the inboard disk 41a that is opposed to the thrust roller and retainer assemblies 53. Thus, the number of components of such a thrust roller bearing is far smaller than the total number of component parts of conventional thrust roller bearings supporting the respective planetary rollers and including separate raceway disks.

As a result thereof, it is possible to easily assemble the carrier 40, and to effectively prevent human errors such as misplacements and/or inadvertent omissions of parts of the thrust roller bearing.

Figure 7:
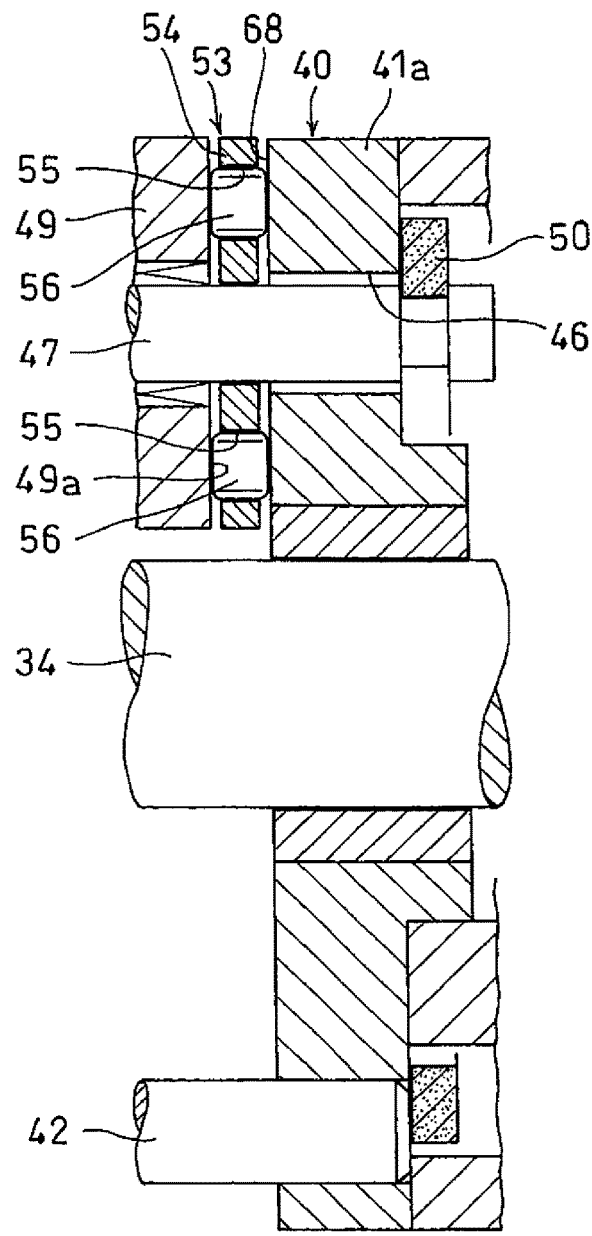
FIG. 7 is a sectional view of another electric linear motion actuator embodying the present invention.
Figure 8:
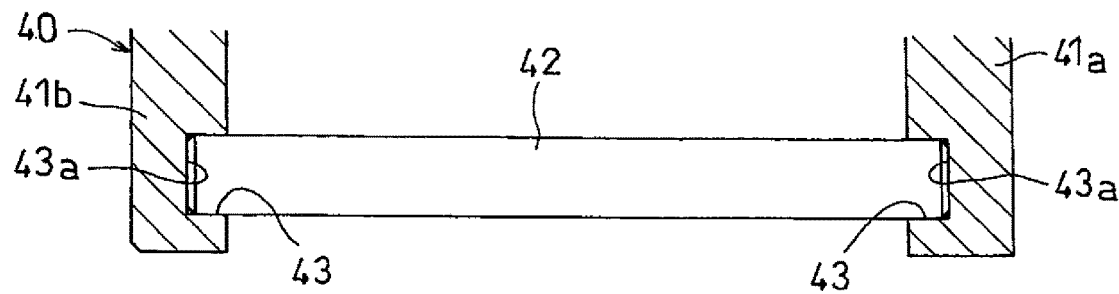
FIG. 8 is a sectional view illustrating a different connection structure between pillar members and respective disks.

FIG. 7 illustrates another electric linear motion actuator A embodying the present invention. This electric linear motion actuator A is different from the electric linear motion actuator A of FIG. 6 only in that instead of the common raceway disk 57 illustrated in FIG. 6, the inner surface of the inboard disk 41a of the carrier 40 opposed to the thrust roller and retainer assemblies 53 is used as a common raceway 68 that is common to all of the thrust roller and retainer assemblies 53. Therefore, as for the elements corresponding to elements illustrated in FIG. 6, the same reference numerals as used in FIG. 6 are used below, and their description is omitted.

The disk 41a is formed by plastic working of, i.e., by pressing, a metal member, and its raceway 68, by which the roller elements 56 of the respective thrust roller and retainer assemblies 53 are guided while rolling is subjected to heat treatment, and ground to a surface roughness Ra of 0.2 or less.

Since the electric linear motion actuator A of FIG. 7 is configured such that the inner surface of the inboard disk 41a opposed to the thrust roller and retainer assemblies 53 is used as a common raceway 68 common to all of the thrust roller and retainer assemblies 53, the number of components constituting the thrust roller bearing illustrated in FIG. 7 can be further reduced, compared to the thrust roller bearing illustrated in FIG. 6. As a result thereof, it is possible to more easily assemble the carrier 40, and to more effectively prevent misplacements and/or inadvertent omissions of components of the thrust roller bearing.

Since, in FIG. 2, the carrier 40 is assembled by press-fitting both ends of each pillar member 42 into the corresponding axially opposed connection holes 43 of the disks 41a and 41b, it is possible to very easily assemble the carrier 40, compared to assembling the carrier by fastening the disks and the pillar members by bolts.

When assembling the carrier 40, both press-fitting and fixation by adhesion may be used together. However, only fixation by adhesion may not be able to reliably assemble the carrier 40. Though welding may be used, it takes more time to assemble the carrier 40 by welding. Therefore, press-fitting makes it possible to assemble the carrier 40 very easily, and to reduce costs.

The connection holes 43 of the disks 41a and 41b may be formed by machining. Alternatively, the connection holes 43 may be formed at the same time as the disks 41a and 41b are formed either by plastic working, i.e., by pressing or forging or by sintering metal powder.

In the above embodiments, the disks 41a and 41b are formed by plastic working or by sintering metal powder. By forming the disks 41a and 41b in this way, it is possible to dispense with machining, and thus to reduce costs. Also, since the pillar members 42 are provided separately from the disks 41a and 41b, it is possible to use the same components for the disk 41a and the disk 41b, and thus to further reduce costs.

FIGS. 8 to 12 illustrate different connection structures between the pillar members 42 and the disks 41a and 41b.

In FIG. 4, the disks 41a and 41b are each formed with connection holes 43 comprising circular blind holes each having a closed end wall 43a, and both ends of each pillar member 42 comprising a round shaft are press-fitted in one of the connection holes 43 of the disk 41a and the corresponding connection hole 43 of the disk 41b, respectively. Since the connection holes 43 of the disks 41a and 41b comprise blind holes each having a closed end wall 43a, the closed end wall 43a of each connection hole 43 of the disk 41a and the closed end wall 43a of the corresponding connection hole 43 of the disk 41b can restrict the amount by which the corresponding pillar member 42 is press-fitted therein. As a result thereof, the opposed disks 41a and 41b can be accurately positioned at a predetermined distance from each other, and thus the dimensional accuracy of the carrier 40 is high.

Figure 9:
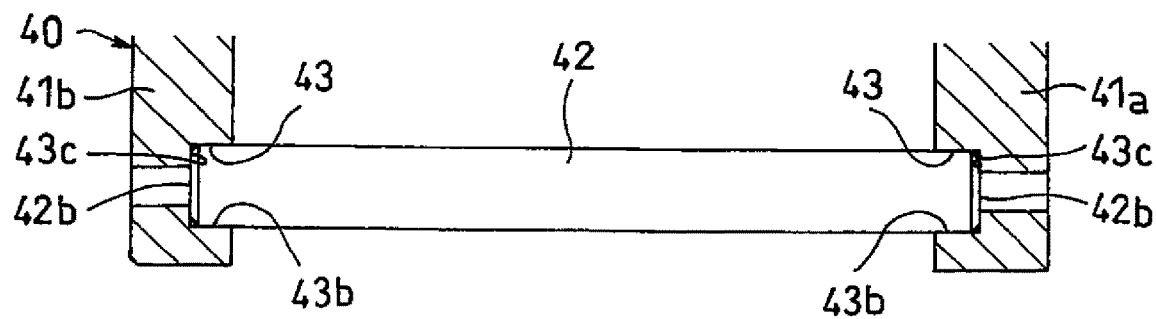
FIG. 9 is a sectional view illustrating a still different connection structure between the pillar members and the respective disks.

In FIG. 9, the disks 41a and 41b are each formed with connection holes 43 comprising stepped through holes each having a large diameter hole portion 43b and a step 43c which constitutes the bottom of the large diameter hole portion 43b; the large diameter hole portion 43b of each connection hole 43 of the disk 41a is opposed to the large diameter hole portion 43b of the corresponding connection hole 43 of the disk 41b; and both ends of each pillar member 42 comprising a round shaft having axial end surfaces 42b are press-fitted in the corresponding opposed large diameter hole portions 43b, respectively. Since the connection holes 43 comprise stepped through holes, by bringing the axial end surfaces 42b of each pillar member 42 into abutment with the steps 43c which constitute the bottoms of the corresponding opposed large diameter hole portions 43b, it is possible to restrict the amount by which the pillar members 42 are press-fitted therein. As a result thereof, as in the connection holes 43 comprising blind holes, the opposed disks 41a and 41b can be accurately positioned at a predetermined distance from each other, and thus the dimensional accuracy of the carrier 40 is high.

Figure 10:
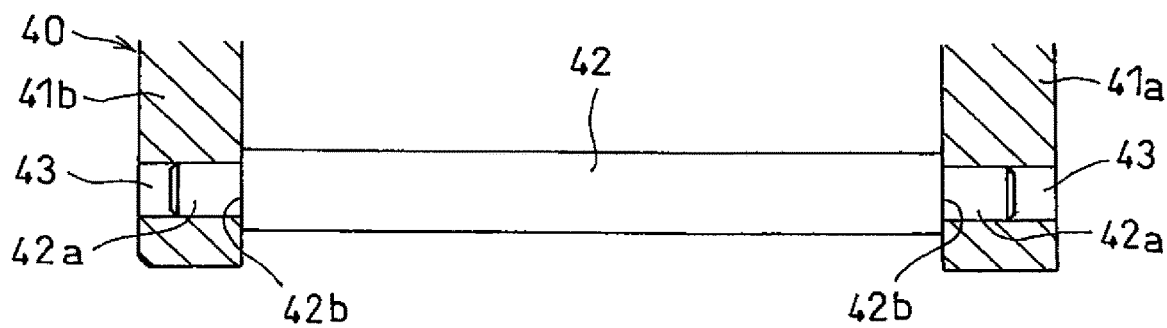
FIG. 10 is a sectional view illustrating a yet different connection structure between the pillar members and the respective disks.

In FIG. 10, each pillar member 42 comprising a round shaft is formed at both ends thereof with stepped portions 42a comprising small diameter shaft portions; the disks 41a and 41b are each formed with circular connection holes 43 comprising through holes; and the stepped portions 42a at both ends of each pillar member 42 are press-fitted in one of the connection holes 43 of the disk 41a and the corresponding connection hole 43 of the disk 41b, respectively.

By press-fitting the stepped portions 42a of each pillar member 42 therein as described above such that axial end surfaces 42b formed at the roots of the respective stepped portions 42a are brought into abutment with the opposed inner surfaces of the disks 41a and 41b, it is possible to restrict the amount by which the pillar members 42 are press-fitted therein. As a result thereof, as in the connection holes 43 comprising blind holes, the opposed disks 41a and 41b can be accurately positioned at a predetermined distance from each other at a regular interval, and thus the dimensional accuracy of the carrier 40 is high.

Figure 11A:
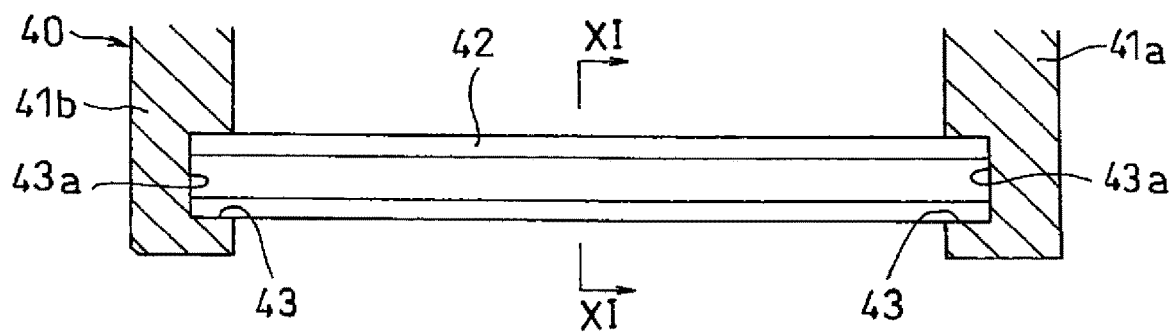
FIG. 11A is a sectional view illustrating different pillar members.
Figure 11B:
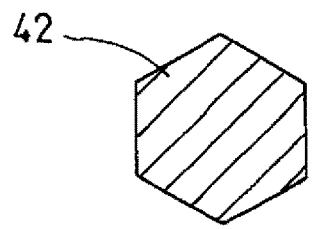
FIG. 11B is a sectional view taken along line XI-XI of FIG. 11A.

In FIGS. 11A and 11B, the pillar members 42 have a polygonal cross-section; the disks 41a and 41b are each formed with connection holes 43 comprising blind holes having a polygonal cross-section and a closed end wall 43a; and both ends of each pillar member 42 are press-fitted in one of the connection holes 43 of the disk 41a and the corresponding connection hole 43 of the disk 41b, respectively. In this case, too, as in FIG. 8, the end wall 43a of each connection hole 43 of the disk 41a and the end wall 43a of the corresponding connection hole 43 of the disk 41b can restrict the amount by which the corresponding pillar member 42 is press-fitted therein. As a result thereof, the opposed disks 41a and 41b can be accurately positioned at a predetermined distance from each other, and thus the dimensional accuracy of the carrier 40 is high.

Figure 12A:
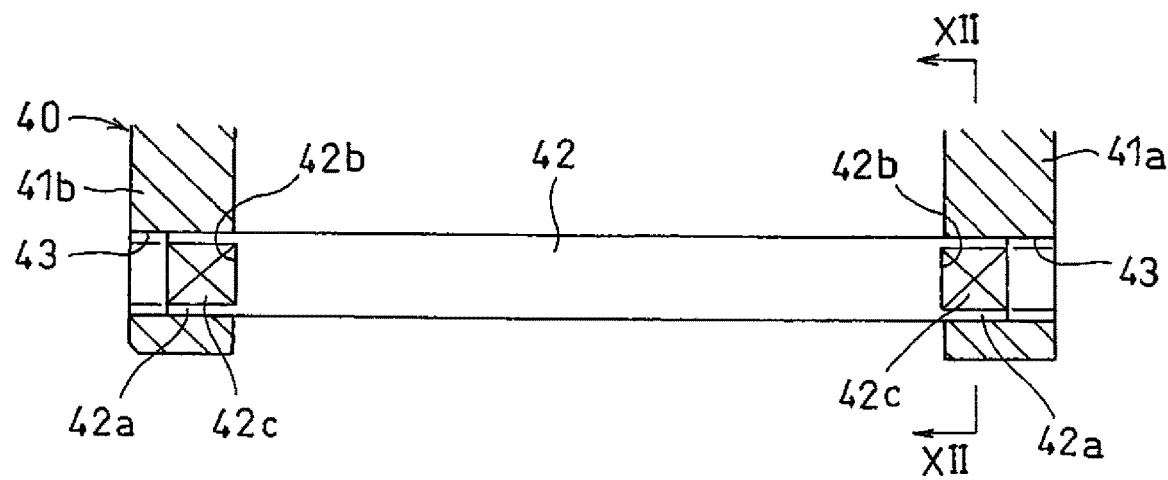
FIG. 12A is a sectional view illustrating another means for restricting the amount by which the pillar members are press-fitted.
Figure 12B:
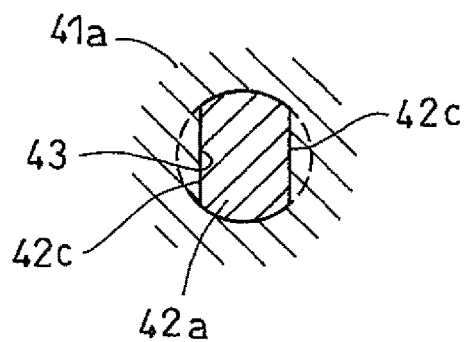
FIG. 12B is a sectional view taken along line XII-XII of FIG. 12A.

While, in FIG. 10, the stepped portions 42a at both ends of each pillar member 42 comprise small diameter shaft portions, in FIGS. 12A and 12B, each pillar member 42 comprising a round shaft is formed at both ends thereof with stepped portions 42a having a track-shaped cross-section, i.e., each formed on its outer periphery with a pair of opposed flat portions 42c so that the stepped portions 42a each have a cross-sectional area smaller than that of the middle portion of the pillar member 42. The disks 41a and 41b are each formed with connection holes 43 having a track-shaped cross-section complementary to the cross-sectional shape of the corresponding stepped portion 42a. The stepped portions 42 of each pillar member 42 are press-fitted in one of the connection holes 43 of the disk 41a and the corresponding connection hole 43 of the disk 41b, respectively.

In FIGS. 12A and 12B, too, by bringing axial end surfaces 42b formed at the roots of the respective stepped portions 42a of each pillar member 42 into abutment with the opposed inner surfaces of the disks 41a and 41b, it is possible to restrict the amount by which the pillar members 42 are press-fitted therein. As a result thereof, the opposed disks 41a and 41b can be accurately positioned at a predetermined distance from each other, and thus the dimensional accuracy of the carrier 40 is high.

DESCRIPTION OF REFERENCE NUMERALS

A: electric linear motion actuator
10: disk rotor
13, 14: brake pad
20: housing
21: outer ring member
24: electric motor
34: rotary shaft
40: carrier
41a, 41b: disk
42: pillar member
42a: stepped portion
42b: axial end surface
43: connection hole
43a: closed end wall
43b: large diameter hole portion
43c: step
47: roller shaft
49: planetary roller
49a: end surface (raceway)
51: helical rib
52: circumferential groove
53: thrust roller and retainer assembly
57: raceway disk
62, 68: raceway

The invention claimed is:
1. An electric linear motion actuator comprising:
a housing;
a cylindrical outer ring member having a center axis, and mounted in the housing;
a rotary shaft arranged on the center axis of the outer ring member, and configured to be rotated by an electric motor;
a carrier including opposed first and second disks configured to be rotatable about the rotary shaft, and a plurality of pillar members retaining the first and second disks at a predetermined distance from each other;
a plurality of planetary rollers mounted between an outer diameter surface of the rotary shaft and an inner diameter surface of the outer ring member, and rotatably supported by the carrier;
wherein the outer ring member is formed, on the inner diameter surface of the outer ring member, with a helical rib, and each of the planetary rollers is formed, in an outer diameter surface of the planetary roller, with either circumferential grooves or a helical groove in which the helical rib is engaged; and
a plurality of thrust roller and retainer assemblies each mounted between one of the planetary rollers and a surface of the first disk of the carrier that is opposed to the one of the planetary rollers such that thrust loads applied to the planetary rollers are supported by the respective thrust roller and retainer assemblies,
wherein the electric linear motion actuator is configured such that when the rotary shaft rotates, due to frictional contact of the planetary rollers with the rotary shaft, the planetary rollers rotate about axes of the respective planetary rollers while revolving around the rotary shaft so that the outer ring member and the carrier axially linearly move relative to each other; and
wherein the electric linear motion actuator further comprises a common annular raceway disk common to all of the thrust roller and retainer assemblies, the common annular raceway disk being mounted between the thrust roller and retainer assemblies and a surface of the first disk that is opposed to the thrust roller and retainer assemblies.

2. The electric linear motion actuator according to claim 1, wherein the raceway disk is formed by plastic working, and includes a heat-treated raceway which is opposed to the thrust roller and retainer assemblies.

3. An electric linear motion actuator comprising:
a housing;
a cylindrical outer ring member having a center axis, and mounted in the housing;
a rotary shaft arranged on the center axis of the outer ring member, and configured to be rotated by an electric motor;
a carrier including opposed first and second disks configured to be rotatable about the rotary shaft, and a plurality of pillar members retaining the first and second disks at a predetermined distance from each other;
a plurality of planetary rollers mounted between an outer diameter surface of the rotary shaft and an inner diameter surface of the outer ring member, and rotatably supported by the carrier;
wherein the outer ring member is formed, on the inner diameter surface of the outer ring member, with a helical rib, and each of the planetary rollers is formed, in an outer diameter surface of the planetary roller, with either circumferential grooves or a helical groove in which the helical rib is engaged; and
a plurality of thrust roller and retainer assemblies each mounted between one of the planetary rollers and a surface of the first disk of the carrier that is opposed to the one of the planetary rollers such that thrust loads applied to the planetary rollers are supported by the respective thrust roller and retainer assemblies,
wherein the electric linear motion actuator is configured such that when the rotary shaft rotates, due to frictional contact of the planetary rollers with the rotary shaft, the planetary rollers rotate about axes of the respective planetary rollers while revolving around the rotary shaft so that the outer ring member and the carrier axially linearly move relative to each other; and wherein the first disk includes an inner surface opposed to the thrust roller and retainer assemblies, and configured to serve as a common raceway that is common to all of the thrust roller and retainer assemblies.

4. The electric linear motion actuator according to claim 3, wherein the first disk is formed by plastic working, and the common raceway is a heat-treated surface.

5. The electric linear motion actuator according to claim 1, wherein each of the first and second disks is formed with connection holes, and each of the pillar members includes two ends press-fitted, respectively, in one of the connection holes of the first disk and in a corresponding one of the connection holes of the second disk.

6. The electric linear motion actuator according to claim 5, wherein the connection holes of the first and second disks comprise blind holes each having a closed end wall.

7. The electric linear motion actuator according to claim 5, wherein the connection holes of the first and second disks comprise stepped through holes each having a large diameter hole portion and a step which constitutes a bottom of the large diameter hole portion, and the large diameter hole portion of each of the connection holes of the first disk is opposed to the large diameter hole portion of a corresponding one of the connection holes of the second disk, and wherein the two ends of each of the pillar members are press-fitted, respectively, in corresponding opposed ones of the large diameter hole portions of the connection holes of the first and second disks such that two axial end surfaces of the pillar member are brought into abutment with the respective steps of the corresponding opposed ones of the large diameter hole portions.

8. The electric linear motion actuator according to claim 5, wherein the two ends of each of the pillar members are each formed with a stepped portion having an outer diameter smaller than an outer diameter of a middle portion of the pillar member, and wherein the stepped portions at the two ends of each of the pillar members are press-fitted, respectively, in one of the connection holes of the first disk and in a corresponding one of the connection holes of the second disk such that two axial end surfaces formed at respective roots of the stepped portions are brought into abutment with opposed inner surfaces of the first and second disk.

9. The electric linear motion actuator according to claim 1, wherein the pillar members consist of three or more pillar members.

10. The electric linear motion actuator according to claim 1, wherein the first and second disks are formed either by plastic working or by sintering metal powder.

11. An electromechanical brake system comprising:
a brake pad;
a disk rotor; and
an electric linear motion actuator configured to linearly drive the brake pad such that the brake pad is pressed against the disk rotor, thereby applying a braking force to the disk rotor,
wherein the electric linear motion actuator comprises the electric linear motion actuator according to claim 1.

12. The electric linear motion actuator according to claim 2, wherein each of the first and second disks is formed with connection holes, and each of the pillar members includes two ends press-fitted, respectively, in one of the connection holes of the first disk and in a corresponding one of the connection holes of the second disk.

13. The electric linear motion actuator according to claim 3, wherein each of the first and second disks is formed with connection holes, and each of the pillar members includes two ends press-fitted, respectively, in one of the connection holes of the first disk and in a corresponding one of the connection holes of the second disk.

14. The electric linear motion actuator according to claim 4, wherein each of the first and second disks is formed with connection holes, and each of the pillar members includes two ends press-fitted, respectively, in one of the connection holes of the first disk and in a corresponding one of the connection holes of the second disk.

15. The electric linear motion actuator according to claim 12, wherein the connection holes of the first and second disks comprise blind holes each having a closed end wall.

16. The electric linear motion actuator according to claim 13, wherein the connection holes of the first and second disks comprise blind holes each having a closed end wall.

17. The electric linear motion actuator according to claim 13, wherein the connection holes of the first and second disks comprise stepped through holes each having a large diameter hole portion and a step which constitutes a bottom of the large diameter hole portion, and the large diameter hole portion of each of the connection holes of the first disk is opposed to the large diameter hole portion of a corresponding one of the connection holes of the second disk, and wherein the two ends of each of the pillar members are press-fitted, respectively, in corresponding opposed ones of the large diameter hole portions of the connection holes of the first and second disks such that two axial end surfaces of the pillar member are brought into abutment with the respective steps of the corresponding opposed ones of the large diameter hole portions.

18. The electric linear motion actuator according to claim 6, wherein the two ends of each of the pillar members are each formed with a stepped portion having an outer diameter smaller than an outer diameter of a middle portion of the pillar member, and wherein the stepped portions at the two ends of each of the pillar members are press-fitted, respectively, in one of the connection holes of the first disk and in a corresponding one of the connection holes of the second disk such that two axial end surfaces formed at respective roots of the stepped portions are brought into abutment with opposed inner surfaces of the first and second disk.

19. The electric linear motion actuator according to claim 3, wherein the first and second disks are formed either by plastic working or by sintering metal powder.

20. An electromechanical brake system comprising:
a brake pad;
a disk rotor; and
an electric linear motion actuator configured to linearly drive the brake pad such that the brake pad is pressed against the disk rotor, thereby applying a braking force to the disk rotor,
wherein the electric linear motion actuator comprises the electric linear motion actuator according to claim 3.

* * * * *